United States Patent
Lafond et al.

(10) Patent No.: US 12,516,744 B2
(45) Date of Patent: Jan. 6, 2026

(54) ACTUATOR OF AN ELECTRICAL REGULATING EQUIPMENT

(71) Applicant: LIEBHERR-AEROSPACE TOULOUSE SAS, Toulouse (FR)

(72) Inventors: Eric Lafond, Toulouse (FR); Rémi Wojcieszonak, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 0 days.

(21) Appl. No.: 18/211,248

(22) Filed: Jun. 17, 2023

(65) Prior Publication Data
US 2025/0215990 A1 Jul. 3, 2025

(30) Foreign Application Priority Data
Jun. 17, 2022 (FR) ...................................... 2205954

(51) Int. Cl.
| | | |
|---|---|---|
| F16K 31/04 | (2006.01) | |
| F16K 1/22 | (2006.01) | |
| F16K 31/53 | (2006.01) | |
| F16H 1/28 | (2006.01) | |

(52) U.S. Cl.
CPC ............ *F16K 31/043* (2013.01); *F16K 1/221* (2013.01); *F16K 31/042* (2013.01); *F16K 31/535* (2013.01); *F16H 2001/2872* (2013.01)

(58) Field of Classification Search
CPC ...... F16K 31/043; F16K 1/221; F16K 31/042; F16K 31/535; F16K 31/563; F16K 1/22–2285

USPC ................. 251/69, 129.11–129.13, 305–308, 251/248–250.5
See application file for complete search history.

(56) References Cited

U.S. PATENT DOCUMENTS

| | | | | |
|---|---|---|---|---|
| 2,018,035 A | * | 10/1935 | Roth .......................... | F23N 3/08 251/249.5 |
| 3,113,473 A | * | 12/1963 | Morlen ................. | F16K 31/047 475/155 |
| 4,063,710 A | * | 12/1977 | Minami .................. | F16K 1/221 251/248 |

(Continued)

FOREIGN PATENT DOCUMENTS

| | | |
|---|---|---|
| DE | 102021103591 A1 | 10/2021 |
| EP | 2251536 B1 | 12/2012 |

*Primary Examiner* — John Bastianelli
(74) *Attorney, Agent, or Firm* — CRGO Global; Steven M. Greenberg

(57) ABSTRACT

The invention relates to an actuator of an electric equipment for regulating a flow of fluid in a conduit comprising a housing (44), an electric motor (10), a concentric, reversible, planetary reducing gear housed in said housing and mechanically connected to said motor and comprising a first reducing stage and a second reducing stage comprising at least one planet gear (31, 32, 33) with superposed outer double toothing, said top toothing (31a) being engaged with a fixed ring gear (34) and said bottom toothing (31b) being engaged with a mobile ring gear (35), and a concentric torsion spring (42) arranged around said mobile ring gear (35), mechanically connected to the housing (44) and to the mobile ring gear (35), and configured to be able to spontaneously cause the movement of said mobile ring gear (35) and of an output shaft (40) into a predetermined position in the event of a loss of electric power supply of said electric motor (10).

7 Claims, 7 Drawing Sheets

(56) References Cited

U.S. PATENT DOCUMENTS

| | | | | |
|---|---|---|---|---|
| 4,616,528 | A | * | 10/1986 | Malinski ................. F16K 31/05 475/263 |
| 6,254,058 | B1 | * | 7/2001 | Keller .................... F16K 31/566 251/129.11 |
| 6,918,572 | B2 | * | 7/2005 | Minegishi ............. F16K 31/048 475/179 |
| 7,163,192 | B2 | * | 1/2007 | Aoki ..................... F16K 31/045 251/248 |
| 2011/0049407 | A1 | | 3/2011 | Park |
| 2020/0124138 | A1 | * | 4/2020 | West ....................... F16K 1/221 |

* cited by examiner

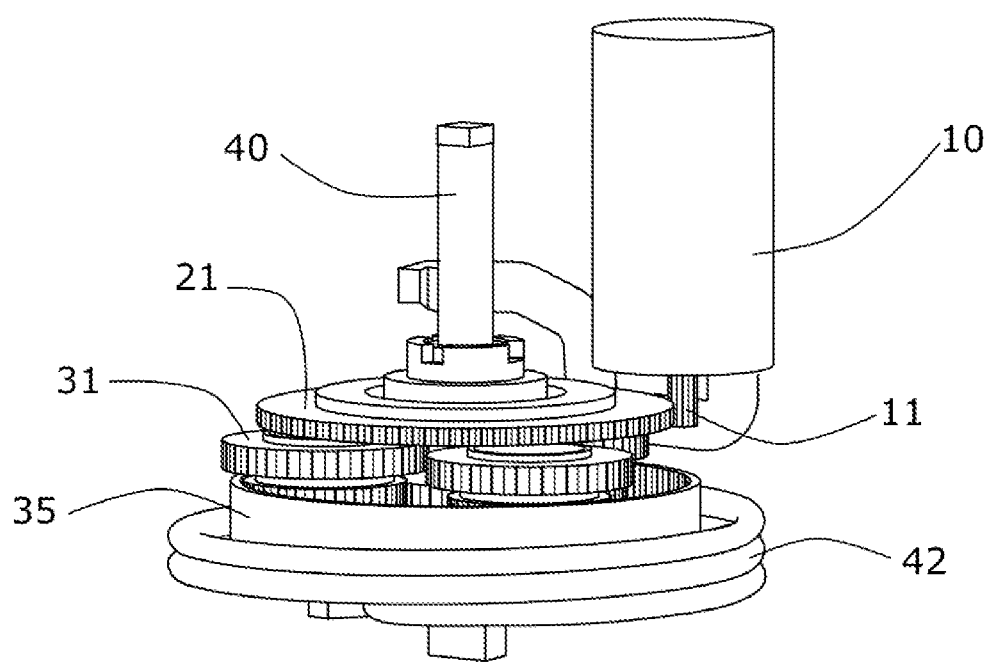
[Fig. 1]

[Fig. 2]
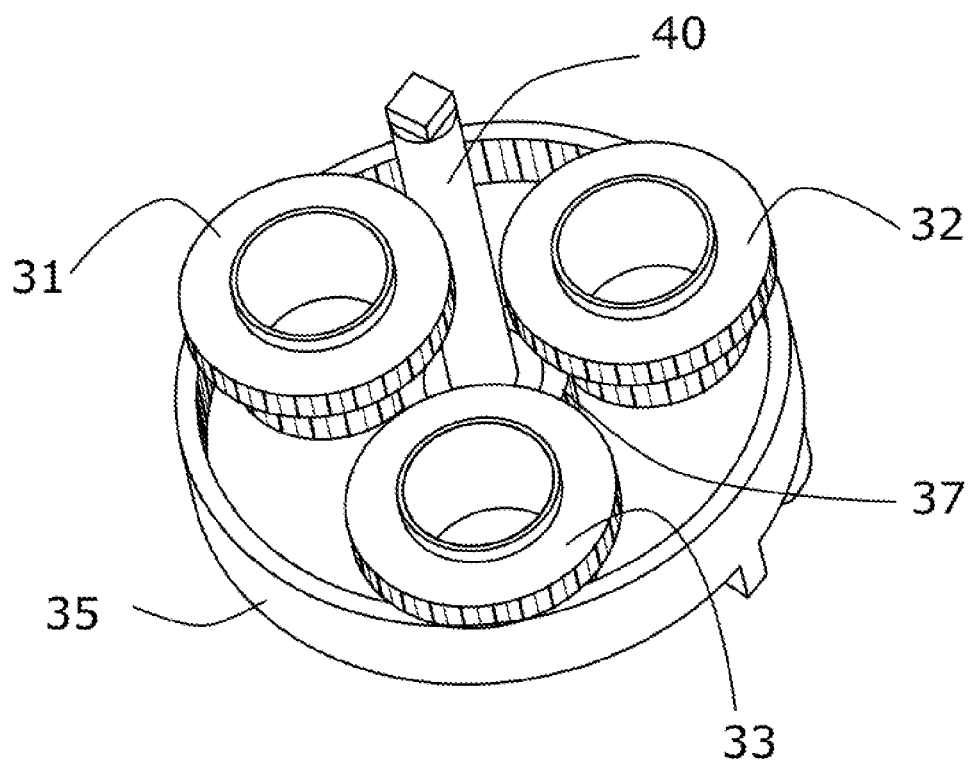

[Fig. 3]
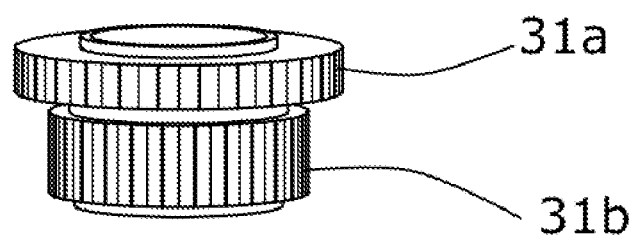

[Fig. 4a]
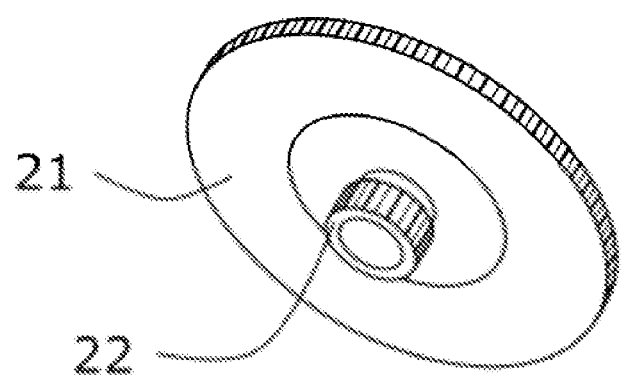

[Fig. 4b]
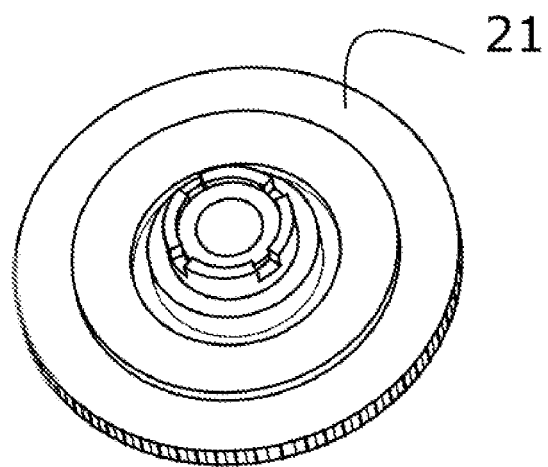

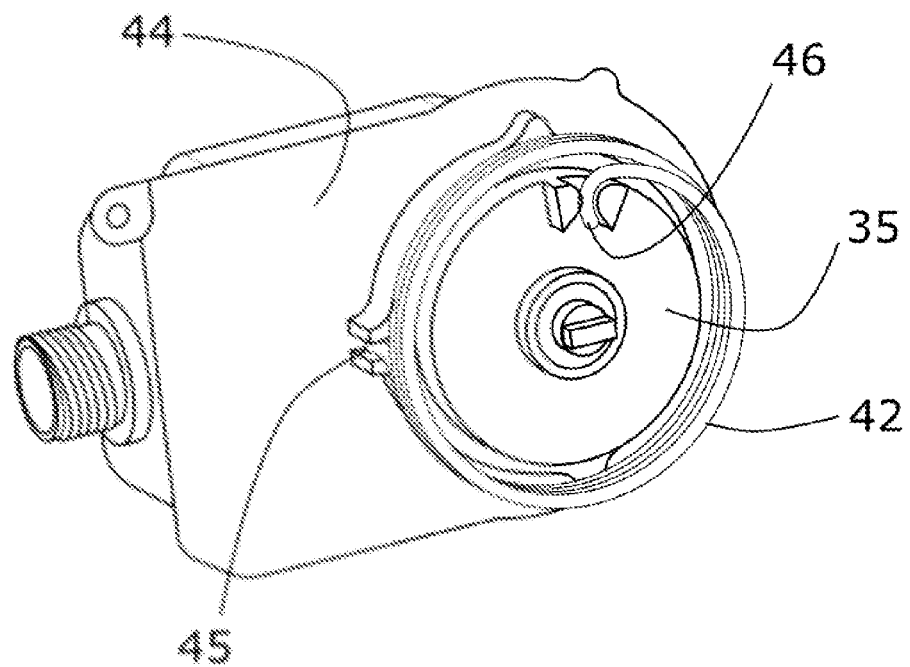
[Fig. 5]

[Fig. 6]
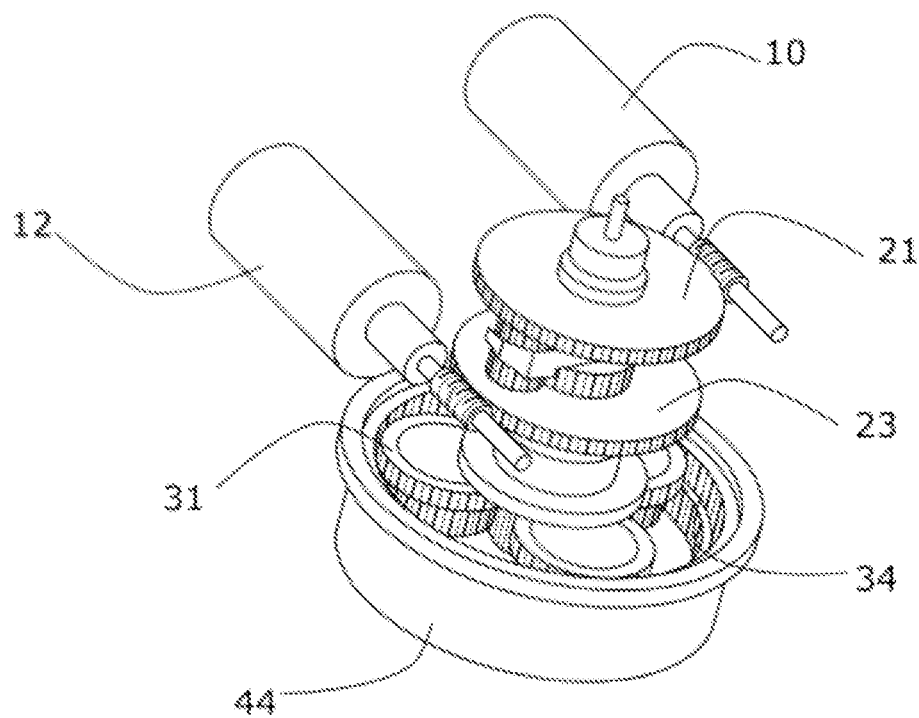

ACTUATOR OF AN ELECTRICAL REGULATING EQUIPMENT

CROSS-REFERENCE TO RELATED APPLICATIONS

This application claims priority under 35 U.S.C. § 119 (a) to France patent application number 2205954, filed on Jun. 17, 2022, the entire teachings of which are incorporated herein by reference.

TECHNICAL FIELD OF THE INVENTION

The invention relates to an actuator of an electric equipment for regulating a flow of fluid in a conduit, of the regulating valve type, equipped with a regulating member, of the butterfly valve type, the position of which within the conduit determines the flow rate and/or pressure and/or temperature of the flow of fluid flowing in this conduit.

TECHNOLOGICAL BACKGROUND

An aircraft comprises different types of fluid system, such as air systems or vapor cycle systems.

An air system generally comprises a plurality of air conduits and a plurality of valves for regulating the air flow in the conduits in order to carry air from air sources towards air-consuming equipment.

By way of non-limiting example, such an air system is e.g. an air-conditioning system of a cabin of the aircraft. Such an air-conditioning system of an aircraft cabin (also referred to as an "air conditioning pack") generally comprises a device for drawing in compressed air, more commonly known as bleed air, from at least one compressor of an engine of the aircraft (such as e.g. a propulsion engine or an auxiliary engine of the aircraft), an air-cycle turbomachine, heat exchangers, a network of conduits comprising valves for regulating the air flow, and a central computer configured to be able to control the opening/closing of the regulating valves depending on the in-flight conditions of the aircraft.

The regulating valves can be, according to the air systems, pneumatic valves, electropneumatic valves or electric valves.

The electric or electropneumatic valves of such an air system generally comprise a closure member such as a butterfly valve mounted on an axis perpendicular to the flow of air flowing in the air conduit in which it is disposed. This butterfly valve is mechanically connected to a mechanical reducing gear driven by an electric motor such as a brushed motor or a stepper motor.

These air distributing or regulating valves are used for the partitioning of sub-systems and/or for regulating the flow rate, pressure and temperature of the air of the system.

It is sometimes necessary for these valves to have a preferred position (open, closed or intermediate). This functionality is called "fail safe" functionality.

The inventors have sought to propose a piece of electric equipment for regulating air, such as a regulating valve, which is provided with a functionality for returning to a preferred position in the event of a loss of electric power supply of the motor. In other words, the inventors have sought to provide a piece of electric regulating equipment with a "fail safe" functionality.

Aims of the Invention

The invention aims to provide an actuator of a piece of electric equipment for regulating a flow of fluid in a conduit, of the regulating valve type, equipped with a regulating member, of the butterfly valve type, which has a functionality for returning to a preferred position in the event of a loss of electric power supply.

The invention also aims to provide, in at least one embodiment, such a piece of equipment which is easy to assemble.

The invention also aims to provide, in at least one embodiment, such a piece of equipment which takes up little space.

The invention also aims to provide, in at least one embodiment, such a piece of equipment which can have at least two distinct operating modes.

The invention also aims to provide a piece of electric regulating equipment equipped with an actuator in accordance with the invention.

DESCRIPTION OF THE INVENTION

To this end, the invention relates to an actuator of an electric equipment for regulating a flow of fluid in a conduit, of the regulating valve type, equipped with a regulating member, of the butterfly valve type, the position of which within the conduit determines at least one parameter of the flow of fluid flowing from upstream to downstream of the regulating member, said actuator comprising a housing and an electric motor provided with a drive shaft adapted to be rotated when the motor is supplied with electric power.

The actuator in accordance with the invention is characterized in that it further comprises:

- a concentric, reversible, planetary reducing gear housed in said housing and mechanically connected to said drive shaft and comprising a first reducing stage comprising a sun gear fixedly attached to a toothed wheel rotationally driven by said drive shaft and meshing with a second reducing stage comprising at least one planet gear with superposed outer double toothing, respectively called top toothing and bottom toothing, said top toothing of each planet gear meshing with said sun gear and engaged with a fixed ring gear with inner toothing fixedly attached to said housing and said bottom toothing of each planet gear being engaged with a mobile ring gear with inner toothing fixedly attached to an output shaft, mechanically connected to said regulating member,
- a concentric torsion spring arranged around said mobile ring gear, mechanically connected to the housing and to the mobile ring gear, and configured to be able to spontaneously cause the movement of said mobile ring gear and of said output shaft into a predetermined position in the event of a loss of electric power supply of said electric motor.

The actuator in accordance with the invention has the feature of being able to spontaneously tilt the output shaft of the reducing gear into a predetermined position upon a loss of electric power supply of the motor. In fact, the concentric torsion spring mounted between the mobile ring gear and the housing exerts a restoring torque on the mobile ring gear which carries the output shaft. When the motor is supplied with electric power, the torque produced by the motor and transmitted to the output shaft via the first and second reducing stages is greater than the restoring torque of the spring and thus makes it possible to determine the position of the regulating member mechanically connected to the output shaft. When the electric motor loses electric power supply, the torque produced thereby is zero and the torque produced by the return spring thus drives the mobile ring gear and the output shaft into the position determined by the return spring.

The actuator in accordance with the invention also has the feature of providing a concentric planetary reducing gear which allows the return spring to be housed around the reducing gear, which limits how much space it takes up.

The integration of the spring around the mobile ring gear is permitted by the epicyclic configuration of the reducing gear. In particular, the particular architecture of the reducing gear of the actuator in accordance with the invention makes it possible to use a large-diameter spring, which provides flexibility and the necessary torque over travel of the order of 90°, whilst ensuring that the different elements are housed in the housing.

Furthermore, the different parts of the actuator are stacked one above the other, which contributes to facilitating the assembly of the actuator in accordance with the invention. This facilitated assembly thus contributes to reducing the manufacturing costs of an actuator in accordance with the invention.

Furthermore, the overall reduction of the actuator depends in part on the center distance between the motor and the rotational axis of the toothed wheel which may coincide with the axis of the output shaft. It is also possible to modify the overall reduction by modifying this center distance. In other words, the invention makes it possible to modify the overall reduction of the actuator without modifying the epicyclic stage of the reducing gear.

The piece of electric regulating equipment equipped with the actuator in accordance with the invention can be of any type. It can be an electric valve, a compressor, a fan, etc. Throughout the following, electric regulating valve will essentially be mentioned, it being understood that the invention is not limited only to electric regulating valves. A person skilled in the art will easily understand that the teaching applies mutatis mutandis to any piece of electric regulating equipment. It should also be noted that a piece of electric equipment in accordance with the invention can replace electropneumatic regulating valves.

The parameter of the flow of fluid determined by the regulating member of the piece of regulating equipment can thus be the temperature, flow rate and/or pressure of the flow of fluid flowing from upstream to downstream of the regulating member.

Advantageously and in accordance with the invention, said second reducing stage comprises three planet gears with superposed double toothing, the top toothing of which meshes with said sun gear of said first reducing stage.

According to this aspect of the invention, the reducing gear comprises three planet gears which self-align on the fixed ring gear facing the top toothing of the planet gears. This makes it possible to obtain a first balanced stage whilst facilitating assembly operations.

Advantageously and in accordance with the invention, the reducing gear further comprises a free sun gear engaged with the bottom toothing of the planet gears so as to be able to maintain the meshed position of the three planet gears in said mobile ring gear.

According to this aspect of the invention, the three planet gears can remain meshed within the mobile ring gear, including when the torque increases. The free pinion is mounted to be freely rotatable about the output shaft.

Advantageously and in accordance with the invention, said electric motor comprises an endless screw formed by a part of the drive shaft, meshed with said toothed wheel of said first reducing stage.

According to this aspect of the invention, the drive shaft directly carries an endless screw which acts as a means for meshing with the toothed wheel of the first reducing stage, and also acts as a bearing of the motor.

Advantageously and in accordance with the invention, the actuator further comprises a second electric motor and said first reducing stage comprises a second toothed wheel carrying at least one pinion engaged with said sun gear, said wheel being rotationally driven by said second electric motor to form a second reducing mode.

According to this aspect of the invention, the actuator comprises a differential mounted on the output shaft and driving the epicyclic stage, for example by a cross-shaped spider. This differential is formed by the first and second toothed wheels of the first reducing stage. This differential thus makes it possible to form two different operating modes (according to the electric motor which drives the reducing gear) and to obtain a different reduction for each mode.

Advantageously and in accordance with the invention, the actuator further comprises:
  an electronic control board equipped with at least one input port intended to receive control data of said piece of equipment,
  software loaded on said electronic control board and configured to be able to determine control instructions of the electric motor from data received on said input port.

According to this aspect of the invention, the actuator has an electronic board directly mounted thereon, said board being configured to allow the electric motor(s) of the actuator to be controlled.

Thus, an air system comprising a piece of electric regulating equipment equipped with an actuator in accordance with the invention can transfer the control of the motors of each piece of equipment directly into each piece of equipment. With such a piece of equipment, it is no longer necessary to control the piece of equipment from a central computer.

The invention also relates to a piece of electric equipment for regulating a flow of fluid in a conduit, of the regulating valve type, characterized in that it comprises an actuator in accordance with the invention.

The technical effects and advantages of the actuator in accordance with the invention apply mutatis mutandis to a piece of equipment in accordance with the invention.

The invention also relates to an actuator in accordance with the invention and a piece of electric equipment in accordance with the invention which are characterized in combination by all or some of the features mentioned above or below.

LIST OF FIGURES

Other aims, features and advantages of the invention will become apparent upon reading the following description given solely in a non-limiting way and which makes reference to the attached figures in which:

FIG. 1 is a schematic perspective view of an actuator in accordance with one embodiment of the invention in which the housing is not shown, FIG. 2 is a schematic perspective view of the second reducing stage of the reducing gear of the actuator of FIG. 1, FIG. 3 is a schematic perspective view of a planet gear with double toothing of the second reducing stage of FIG. 2, FIG. 4a is a schematic view of the first reducing stage of the actuator of FIG. 1, seen from below, FIG. 4b is a schematic view of the first reducing stage of the actuator of FIG. 1, seen from above, FIG. 5 is a schematic perspective view of the actuator of FIG. 1 in which the external housing is shown, FIG. 6 is a schematic perspective exploded view of an actuator in accordance with another embodiment of the invention.

DETAILED DESCRIPTION OF AN EMBODIMENT OF THE INVENTION

In the figures, for the purposes of illustration and clarity, scales and proportions have not been strictly respected. Furthermore, identical, similar or analogous elements are designated by the same reference signs in all the figures.

Throughout the following description, the different elements of the actuator are described as being arranged when the actuator is assembled and oriented such that the output shaft extends vertically upwards. This arrangement is shown in particular in FIG. 1.

FIG. 1 illustrates an actuator in accordance with one embodiment of the invention comprising an electric motor 10 having a drive shaft on which there is mounted a drive pinion 11. This drive pinion 11 meshes with a toothed wheel 21. This toothed wheel 21 is fixedly attached to a sun gear 22 housed in its center and rotatable about the output shaft 40. The toothed wheel 21 and the sun gear 22 form the first reducing stage of the reducing gear of the actuator. The toothed wheel 21 is for example formed of aluminum whereas the sun gear 22 is for example formed of nitrided steel. Of course, other materials can be used to form the components of the first stage based on the usage requirements of the actuator.

The sun gear 22 meshes with a second reducing stage, shown schematically in FIG. 2.

This second reducing stage is formed of three planet gears 31, 32, 33, each comprising top toothing and bottom toothing. FIG. 3 schematically illustrates the planet gear 31 comprising top toothing 31a and bottom toothing 31b. The top toothing of the three planet gears 31, 32, 32 meshes with the sun gear 22 and is engaged with a fixed ring gear 34 with inner toothing fixedly attached to the housing. This fixed ring gear 34 is shown schematically in FIG. 6. The bottom toothing of the three planet gears 31, 32, 33 meshes with the inner toothing of a mobile ring gear 35 and a free sun gear 37 which is rotatable about the output shaft 40.

The output shaft 40 is fixedly attached to the mobile ring gear 35. The output shaft 40 is mechanically connected to the regulating member, such as a butterfly valve, not shown in the figures.

Furthermore, the actuator comprises a concentric torsion spring 42 arranged around the mobile ring gear 35 and mechanically connected to the housing 44 and to the mobile ring gear 35. To this end, the housing comprises at least one notch 45 in which there is inserted a first end of the torsion spring 42 and the mobile ring gear 35 comprises a notch 46 in which there is arranged the second end of the torsion spring 42. The spring 42 is arranged about the mobile ring gear 35 and extends the first end to the second end.

An actuator in accordance with the invention can be sized for different power levels and in accordance with the targeted applications. By way of example, the actuator is sized to be able to provide a torque of 20 N/m at a speed of 50°/s over the entire pivoting range of 90° of the regulating member. The torsion spring is selected to have a stiffness making it possible to provide the targeted reverse torque.

This spring can, for example, be formed from processed stainless steel, such as the steel known under the commercial name 12R10.

The torsion spring 42 has a stiffness selected such that it can spontaneously move the mobile ring gear 35 (and thus the output shaft 40 carried by the mobile ring gear 35) when the drive torque of the electric motor 10 is zero. Therefore, the output shaft 40 is spontaneously moved into a predetermined position when the motor 10 is no longer supplied with electric current, this predetermined position being defined by the position at rest of the torsion spring 42.

FIG. 6 illustrates a design variant of the actuator in accordance with the invention, in which the actuator is equipped with a second electric motor 12.

In the embodiment of FIG. 6, the electric motor shafts each carry an endless screw which acts as a drive pinion. The endless screw of the first electric motor 10 meshes with the toothed wheel 21 and the endless screw of the second electric motor 12 meshes with a toothed wheel 23. This toothed wheel 23 is configured to be able to drive the second reducing stage previously described via a cross-shaped spider carrying a pinion which acts as a sun gear 22. This particular embodiment makes it possible to form two operating modes (according to the motor which ensures the driving of the reducing gear) and to benefit from a different reduction for each mode. Furthermore, the pinion fixedly attached to the toothed wheel 21 is engaged with one or more pinions fixedly attached to the toothed wheel 23 such that the activation of the first operating mode (i.e. the mode initiated by the electric motor 10) makes it possible to drive the output shaft by the succession of the following gears: the toothed wheel 21 drives its fixedly attached pinion, meshed with pinions fixedly attached to the toothed wheel 23 which drives the second reducing stage by the cross-shaped spider which drives the sun gear 22 meshed with the planet gears which cause rotation of the mobile ring gear and thus of the output shaft. When the second operating mode is selected (i.e. the mode initiated by the electric motor 12), the movement of the output shaft is ensured by the same succession of gears, the only difference being that the electric motor 12 directly drives the toothed wheel 23.

The actuator in accordance with the invention also comprises an electronic control board equipped with at least one input port intended to receive control data of the piece of equipment. This board is not shown in the figures and is housed in the housing 44 shown in FIG. 5. This electronic board loads software configured to be able to determine control instructions of the electric motor from data received on its input port.

The software is configured to adapt the control of the electric motor (or the electric motors in the case of an actuator having two modes as illustrated in FIG. 6) to the type of equipment controlled by the actuator.

According to one design variant, the electronic board is not fixed to the structure of the housing of the electronic casing but only fixed by the welds of the pins of the airplane connector by which the board can receive control data. This fixing mode facilitates its installation.

The invention claimed is:

1. An actuator of an electric equipment for regulating a flow of fluid in a conduit, of the regulating valve type, equipped with a regulating member, of the butterfly valve type, the position of which within the conduit determines at least one parameter of the flow of fluid flowing from upstream to downstream of the regulating member, said actuator comprising a housing and an electric motor provided with a drive shaft adapted to be rotated when the motor is supplied with electric power, said actuator comprising:

a concentric, reversible, planetary reducing gear housed in said housing and mechanically connected to said drive shaft and comprising a first reducing stage comprising a sun gear fixedly attached to a toothed wheel rotationally driven by said drive shaft and meshing with a second reducing stage comprising at least one planet gear with superposed outer double toothing, respectively called top toothing and bottom toothing, said top toothing of each planet gear meshing with said sun gear and engaged with a fixed ring gear with inner toothing fixedly attached to said housing and said bottom toothing of each planet gear being engaged with a mobile ring gear with inner toothing fixedly attached to an output shaft, mechanically connected to said regulating member, a concentric torsion spring arranged around said mobile ring gear, mechanically connected to the housing and to the mobile ring gear, and configured to be able to spontaneously cause the movement of said mobile ring gear and of said output shaft into a predetermined position in the event of a loss of electric power supply of said electric motor.

2. The actuator as claimed in claim 1, wherein said second reducing stage comprises three planet gears with superposed double toothing, the top toothing of which meshes with said sun gear of said first reducing stage.

3. The actuator as claimed in claim 2, wherein said reducing gear further comprises a free sun gear engaged with the bottom toothing of the planet gears so as to be able to maintain the meshed position of the three planet gears in said mobile ring gear.

4. The actuator as claimed in claim 1, wherein said electric motor comprises an endless screw formed by a part of the drive shaft, meshed with said toothed wheel of said first reducing stage.

5. The actuator as claimed in claim 1, further comprising a second electric motor and in that said first reducing stage comprises a second toothed wheel carrying at least one pinion engaged with said sun gear, said second toothed wheel being rotationally driven by said second electric motor to form a second reducing mode.

6. The actuator as claimed in claim 1, further comprising:

an electronic control board equipped with at least one input port intended to receive control data of said piece of equipment, software loaded on said electronic control board and configured to be able to determine control instructions of the electric motor from data received on said input port.

7. Electric equipment for regulating a flow of fluid in a conduit, of the regulating valve type, the equipment comprising:

an actuator equipped with a regulating member, of the butterfly valve type, the position of which within the conduit determines at least one parameter of the flow of fluid flowing from upstream to downstream of the regulating member, said actuator comprising a housing and an electric motor provided with a drive shaft adapted to be rotated when the motor is supplied with electric power;

a concentric, reversible, planetary reducing gear housed in said housing of the actuator and mechanically connected to said drive shaft and comprising a first reducing stage comprising a sun gear fixedly attached to a toothed wheel rotationally driven by said drive shaft and meshing with a second reducing stage comprising at least one planet gear with superposed outer double toothing, respectively called top toothing and bottom toothing, said top toothing of each planet gear meshing with said sun gear and engaged with a fixed ring gear with inner toothing fixedly attached to said housing and said bottom toothing of each planet gear being engaged with a mobile ring gear with inner toothing fixedly attached to an output shaft, mechanically connected to said regulating member; and, a concentric torsion spring arranged around said mobile ring gear, mechanically connected to the housing and to the mobile ring gear, and configured to be able to spontaneously cause the movement of said mobile ring gear and of said output shaft into a predetermined position in the event of a loss of electric power supply of said electric motor.

\* \* \* \* \*